United States Patent
Lee et al.

(10) Patent No.: US 8,483,649 B2
(45) Date of Patent: Jul. 9, 2013

(54) SYSTEM AND METHOD FOR AN ENERGY EFFICIENT RF TRANSCEIVER

(75) Inventors: Harry Lee, Bellevue, WA (US); Fred E. Schader, San Jose, CA (US); Bong K. Ryu, Poway, CA (US); Liangping Ma, San Diego, CA (US); Hua Zhu, San Diego, CA (US)

(73) Assignee: ARGON ST, Fairfax, VA (US)

( * ) Notice: Subject to any disclaimer, the term of this patent is extended or adjusted under 35 U.S.C. 154(b) by 904 days.

(21) Appl. No.: 12/153,424

(22) Filed: May 19, 2008

(65) Prior Publication Data

US 2008/0304432 A1 Dec. 11, 2008

Related U.S. Application Data

(60) Provisional application No. 60/924,548, filed on May 18, 2007.

(51) Int. Cl.
*H04B 1/16* (2006.01)
*H04W 52/02* (2009.01)

(52) U.S. Cl.
CPC .................. *H04W 52/0229* (2013.01)
USPC ............. 455/343.2; 455/343.3; 455/574

(58) Field of Classification Search
USPC ............ 455/574, 343.2, 343.3, 343.4
See application file for complete search history.

(56) References Cited

U.S. PATENT DOCUMENTS

| | | | | |
|---|---|---|---|---|
| 4,387,371 | A * | 6/1983 | Beker et al. | 340/9.14 |
| 4,811,124 | A * | 3/1989 | Dujari et al. | 360/49 |
| 5,606,313 | A * | 2/1997 | Allen et al. | 340/10.31 |
| 5,722,046 | A * | 2/1998 | Serfaty et al. | 340/7.35 |
| 5,835,730 | A * | 11/1998 | Grossman et al. | 709/247 |
| 6,044,482 | A * | 3/2000 | Wong | 714/758 |
| 6,272,116 | B1 * | 8/2001 | Kurihara | 370/311 |
| 7,257,095 | B2 * | 8/2007 | Liu | 370/311 |
| 7,406,070 | B2 * | 7/2008 | Nilsson | 370/342 |
| 7,522,677 | B2 * | 4/2009 | Liang | 375/316 |
| 7,821,420 | B2 * | 10/2010 | Woollett et al. | 340/870.01 |
| 2003/0103554 | A1 * | 6/2003 | Li et al. | 375/141 |
| 2003/0206559 | A1 * | 11/2003 | Trachewsky et al. | 370/509 |
| 2004/0131193 | A1 * | 7/2004 | Kitamura | 381/28 |
| 2006/0202754 | A1 * | 9/2006 | Yamamura et al. | 330/75 |
| 2006/0240798 | A1 * | 10/2006 | Jarosinski et al. | 455/343.1 |
| 2007/0082647 | A1 * | 4/2007 | Behzad et al. | 455/343.1 |
| 2008/0198666 | A1 * | 8/2008 | Nygren | 365/185.24 |

* cited by examiner

*Primary Examiner* — Duc M Nguyen
(74) *Attorney, Agent, or Firm* — Armstrong Teasdale LLP

(57) ABSTRACT

An energy efficient radio having a clocking system utilizing two clocks with very different precision and power characteristics. In another aspect, the time that a radio spends on listening/receiving is optimized so that energy is not wasted when there is no need to keep receiving. In another aspect, to further improve the energy efficiency, two receive portions with drastic difference in power consumption, instead of a single receive portion as is used in a typical wireless receiver, and are used to process different parts of a received packet.

11 Claims, 5 Drawing Sheets

SYSTEM AND METHOD FOR AN ENERGY EFFICIENT RF TRANSCEIVER

This application claims the benefit of U.S. Provisional Patent Application No. 60/924,548 filed May 18, 2007.

In wireless communications, energy efficiency of a radio/transceiver is critically important since wireless devices are typically battery powered and an energy-inefficient radio requires frequent battery change or recharging. Battery replacement may be costly because of the cost incurred not only in accessing the deployment sites such as remote areas, but also in providing continuous communication during the resulting outage for critical communications networks.

The contributors to energy consumption at a radio include radio transmission, receiving, listening, clocking and other tasks. Typically, the largest load on a radio occurs during transmission, and most efforts for conserving the battery life are directed towards minimizing the energy expenditure on the radio transmission. However, radios that only transmit infrequently present a unique challenge since in such radios non-transmission tasks account for the majority of the total energy consumption and efforts to conserve energy have typically not been directed towards such tasks.

If the traffic load is low, the energy spent on radio transmission and receiving accounts only for a small portion of the total energy consumption, and listening for potential packets actually consumes more energy. Therefore, for wireless data networks such as a typical wireless sensor network where the traffic load is light, significant energy savings can be achieved by putting the radios in the sleep mode most of the time and waking them up only when there is a need for potential communications. This methodology is called duty cycling.

However, the energy-savings of duty cycling comes at the cost of energy consumption on clocking. To make duty cycling work properly, it is crucial to synchronize the wake up times of wireless devices since two wireless devices can communicate only if they rendezvous at the right time instants. Such synchronization requires some clock to run continuously, regardless of whether a wireless device is asleep or awake. The energy spent on clocking accounts for a significant portion of the total energy expenditure when the traffic load is light. Therefore, minimizing the energy consumption due to clocking could greatly improve the energy efficiency of the radio.

Some wireless networks are known for their intermittent traffic patterns. For many wireless data networks such as the wireless sensor network, it is important for the radio to be energy efficient since the wireless devices are typically battery powered and energy inefficient radios require frequent battery replacing or recharging, which is usually costly due to the labor incurred in accessing the deployment sites and replacing or recharging the batteries. In some wireless data networks like the wireless sensor network, the need for data transfer is not persistent in time. Rather, data are transmitted periodically, for example once every 10 minutes, or data are transmitted only when some rare events such as an intrusion are detected. In either case, the actual traffic load on the network is low, and most of the time the radios are idle. In such wireless data networks, the proportion of the energy spent on the actual radio transmission and receiving is small, as opposed to that spent on listening and clocking.

However, the benefit of duty cycling comes at the price of energy spent on clocking. To enable duty cycling, it is necessary for the radios to know when to wake up and when to transmit since a communication is possible only if the transmitter and the receiver can rendezvous at the right time. Clocks are used for such time keeping at each node. Aside from time keeping for duty cycling, timing is also needed for packet synchronization, symbol synchronization and sampling. The timing necessary for packet synchronization, symbol synchronization and sampling is usually much more stringent than the timing required for duty cycling, requiring a high precision clock, which consumes much more power than a low precision clock. In existing design schemes, a single high precision clock is used for synchronization and sampling, as well as duty cycling, resulting in unnecessary high energy consumption. The present disclosure is directed at reducing the energy consumption in low duty cycle networks through the use of an improved energy efficient clocking mechanism.

In another aspect of the present disclosure, additional energy savings can be achieved by optimizing other aspects of the radio, such as the time a radio spends listening for and receiving signals.

In yet another third aspect of the present disclosure, the receiver uses two receive portions with drastic difference in power consumption to process different parts of a packet, and this further improves the energy efficiency.

SUMMARY

In order to significantly improve the energy efficiency of radios in wireless data networks by minimizing the energy consumption on clocking and listening/receiving, the present disclosure describes a clocking system utilizing two clocks with very different precision and power characteristics. The clocks are used to seamlessly provide timing to the radio to meet the unique needs of energy-constrained wireless data networks: energy efficiency and precise timing. In another aspect, the time that a radio spends on listening/receiving is optimized so that energy is not wasted when there is no need to keep receiving. In another aspect, to further improve the energy efficiency, two receive portions with drastic difference in power consumption, instead of a single receive portion as is used in a typical wireless receiver, are used to process different parts of a received packet.

BRIEF DESCRIPTION OF THE DRAWINGS

These and other aspects will now be described in detail with reference to the following drawings.

DETAILED DESCRIPTION

Figure 1:
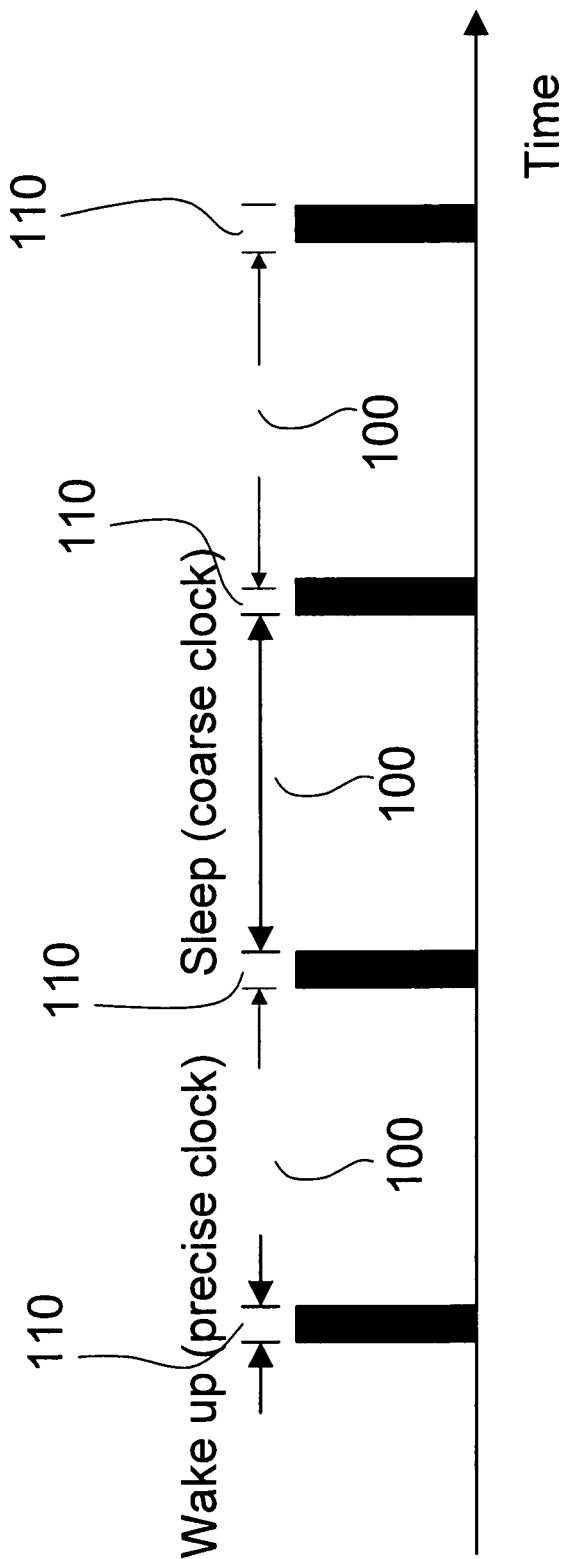
FIG. 1 is a simplified pictorial representation of the use of two clocks in a low duty cycle communications network in accordance with one embodiment of the present disclosure.

FIG. 1 illustrates one aspect of the present disclosure in which two clocks of different precision and power properties may be used to achieve high energy efficiency while meeting the stringent timing requirements. The first clock, which is low in precision, is used for duty cycling. This clock runs at a low frequency, consumes little energy, and offers a precision that is good enough for the radios to wake up. This coarse clock runs during the time when a wireless device is in the sleep mode 100. It may run at all times, or in another embodiment, it may be turned off after the wireless device wakes up to further save energy. Once the radio wakes up, the second clock may be started, which provides precise timing for the transmitting and receiving of the signals 110. Because precise timing is used only for local operations, such as signal synchronization and sampling, there is no need to synchronize the two precise clocks residing at two separate wireless devices, although the present disclosure is broad enough to cover such an embodiment. The precise clock consumes more power than the coarse one, and it is turned off during the period when the radio is in the sleep mode in order to conserve energy. The combination of the two clocks meets the unique needs for both energy efficiency and precise timing of energy-constrained wireless data networks. A suitable clock for use as the course clock may be a 32.768 kHz low-power low-precision system clock, and a suitable high precision clock may be a high-power high-precision clock of up to 520 MHz. While it is known to use multiple clocks in microprocessors in order to provide varying degrees of precision as a function of the required processing function, the use of a coarse and precision clock in a low duty cycle communications network is unique.

Figure 2:
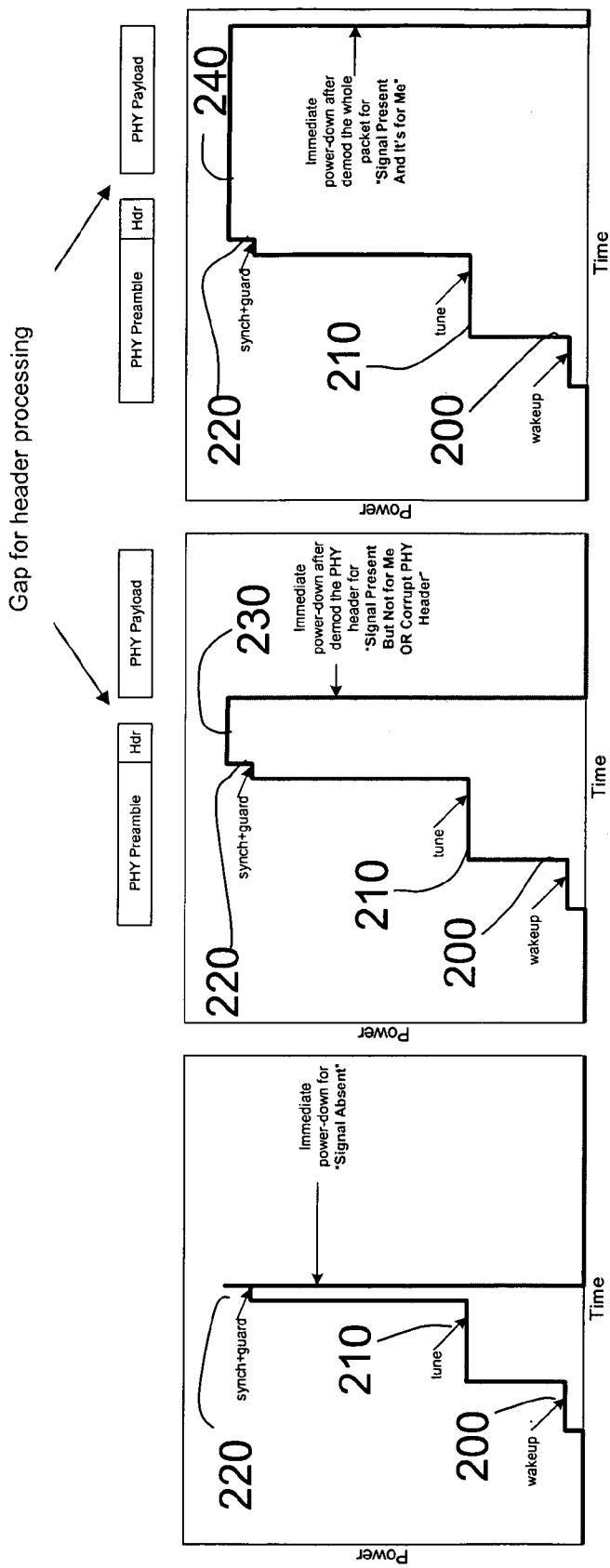
FIG. 2 is a simplified graphical representation of power versus time for one embodiment of the present disclosure.

Further energy savings can be obtained by optimizing the time the radio spends on listening for and receiving traffic once it wakes up. In one aspect, in order to accomplish this, the radio may be shut down when the operation of the radio does not contribute to useful data transfer. This aspect can be considered "just in time" turn-on/off. This aspect is illustrated in FIG. 2. The major radio states are wakeup, tune, synch and demodulation. With reference to FIG. 2A, the radio wakes up 200 and tunes to the desired frequency 210. If the radio detects no presence of any signal 220, the radio is shut down (back to the sleep mode).

With reference to FIG. 2B, if there is a signal present but the radio is not the intended receiver or if the signal is corrupted 230, the radio is also shut down (back to the sleep mode). FIG. 2C illustrates the case in which the signal is present and intact 240, the radio is not shut down but continues to receive the complete packet.

Figure 3:
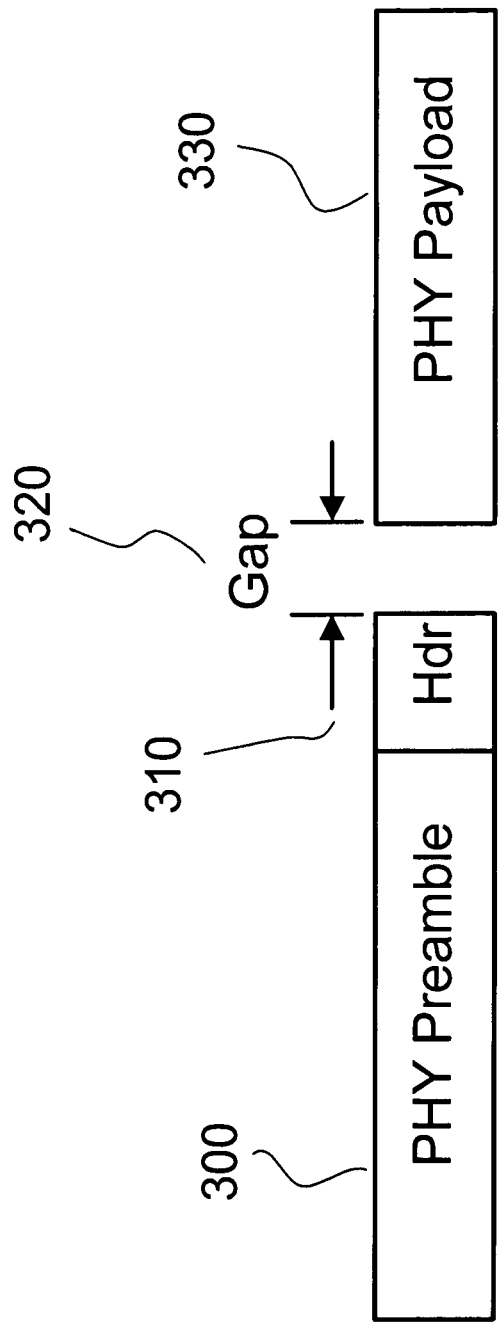
FIG. 3 is a simplified pictorial representation of a packet format for use with one embodiment of the present disclosure.

In order for the receiver to make a correct decision on whether to go back to sleep or continue receiving, the transmitter must provide information on who is the intended receiver as early as possible in the packet. Due to limited processing capability, a receiver cannot know this information immediately after receiving this information (in the form of a signal). It will take the receiver a small amount of time to process this information. A gap is created exclusively to give time to the receiver to process this information. An example of such packet formats is shown in FIG. 3. The packet consists of four parts: Physical layer preamble (PHY Preamble) 300, Physical layer header (PHY Hdr) 310, Gap 320, and Physical layer payload (PHY Payload) 330. The identity of the intended receiver is contained in the PHY Hdr. In one aspect there is no useful information contained in the Gap. From energy prospective, it may seem attractive to have an empty Gap so that the transmitter can be turned off during the Gap. However, if the transmitter is turned off during the Gap to conserve energy, it may actually end up spending more energy, since there is a significant energy overhead associated with the warm up of the radio.

On the receiver side, if the transmitted signal stops for some time, the receiver may lose synchronization to the incoming signal. In one aspect, the Gap may contain a known pattern, for instance a string like 010101. Each bit should be treated as ordinary data in the communication process. The length of the string, or the duration of the Gap 320, is short for current technologies, and the exact value depends on the processor and the amount of information contained in the Physical layer header (PHY Hdr) 310. For example, if a 7.37 MHz Atmega 128L microprocessor is used to process the PHY Hdr, and if it takes the microprocessor 50 CPU cycles to finish the processing, the gap needs to be 6.78 microseconds or longer.

In a typical wireless receiver, the received analog signal is first passed through an analog-to-digital converter (A/D), and the digital output is then processed by a signal processing circuit, which is often implemented in ASIC, FPGA, or CPLD. The processing circuit performs a series of signal processing functions, and has moderate to high complexity depending on the particular signal processing functions being implemented. However, in the case in which it is unnecessary to process the entire packet, as in the example described above, the scheme adopted by the typical wireless receiver pays huge energy penalty because it consumes significant energy just to bring up the A/D and the signal processing circuit.

Figure 4:
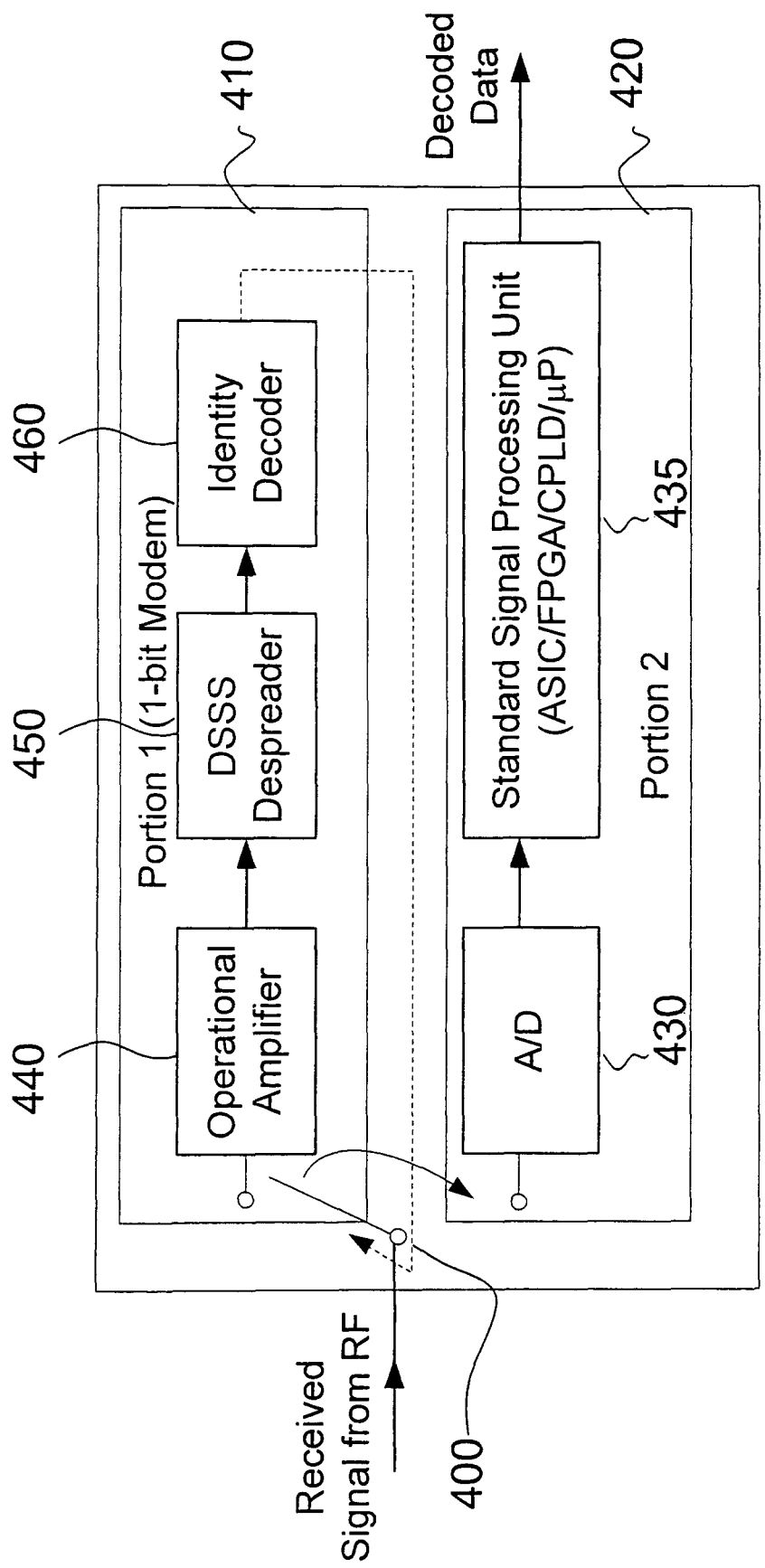
FIG. 4 is a simplified pictorial representation of a two-portion receiver for one embodiment of the present disclosure.
Figure 5:
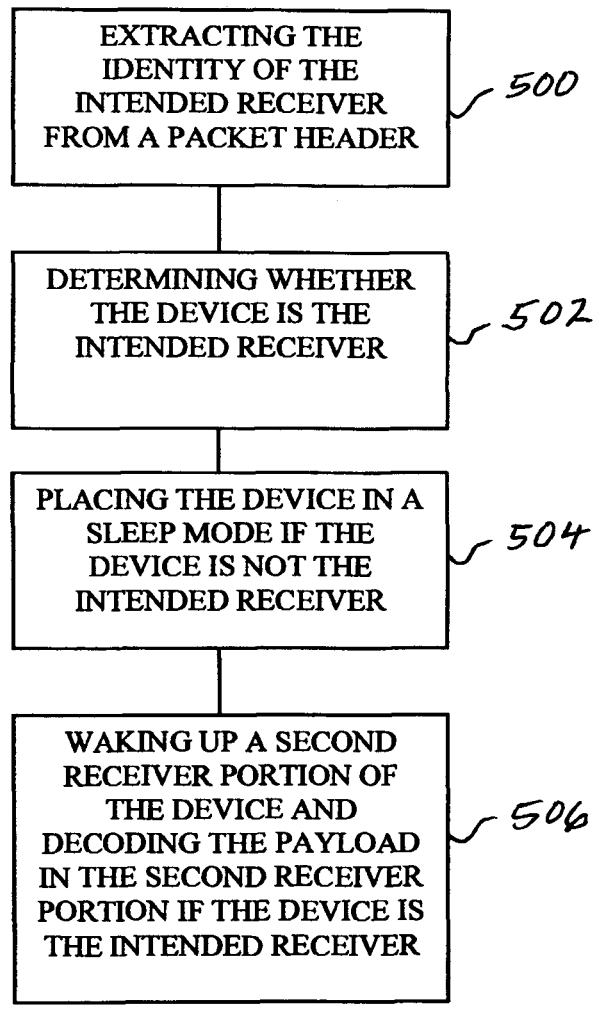
FIG. 5 is a flowchart of an exemplary method for reducing power consumption of a wireless communications device.

With reference to FIG. 4, to further improve the energy efficiency, the receiver can use two receive portions with drastically different power consumption characteristics, instead of just a single receive portion as used in a typical wireless receiver, to process different parts of the received packet. An architecture of the receiver with two receive portions is illustrated in FIG. 4. The first portion 410, which does not have a standard A/D and is low in complexity and power consumption, is dedicated to processing the packet header and extracting 500 (see FIG. 5) the identity of the intended receiver. If the first portion 410 finds out 502 (see FIG. 5) that the intended receiver is the same as the identity of the receiver in which it resides, it will wake up 506 (see FIG. 5) the second portion 420, which has a standard A/D 430 and is moderate or high in complexity and power consumption, to process the rest of the incoming packet. Otherwise, the first portion 410 will not wake up the second portion 420, and will instead trigger 504 (see FIG. 5) the receiver into the sleep mode. The first receive portion 410 decides on the power up of the second receive portion 420, and also it passes the analog signal flow to the second portion 420 if it decides it is necessary to receive the rest of the packet 400.

A typical wireless receiver with some modification can be used for the second receive portion 420. The received analog signal is first passed through an analog-to-digital converter (A/D) 430, and the digital output is then processed by a signal processing circuit 435, which may often implemented in ASIC, FPGA, CPLD, or microprocessor.

This disclosure describes a design, called a one-bit modem, for the first portion 410. As stated above, there is no standard A/D in the first portion 410 for energy efficiency reasons. Instead, the first portion 410 converts the received analog signal into digital through a rail-to-rail operational amplifier 440 such as the LT1635 from Linear Technology. The operation amplifier 440 is different from a standard A/D in that the former outputs either a '1' or a '0', i.e., one bit, for each input analog sample, whereas the latter produces multiple bits for each input analog sample. The operational amplifier 440 consumes much less power than a standard A/D does. As an example, a standard A/D, the AD9280, consumes $9.5 \times 10^{-2}$ Watt. In contrast, the LT1635 operational amplifier consumes only $1.6 \times 10^{-4}$ Watt. The operational amplifier 440 causes severe distortion in the quantized digital output since it effectively quantizes each analog sample into only one bit. To combat this distortion, Direct Sequence Spread Spectrum (DSSS) 450 is used, which also mitigates multi-path fading and rejects narrow band interference. The DSSS 450 significantly reduces the bit error probability in processing the packet header. The bit error probability can be further reduced by applying coding to the identities 460. In this coding 460, each identity is encoded into a binary string, and not all binary strings are legitimate. The receiver first decodes the encoded string in the packet header using DSSS 450. Then, it finds the identity whose encoded string is closest to the one in the packet header. Here, "closest" is in terms of the Hamming distance. The Hamming distance between two binary strings is simply equal to the weight of the bitwise XOR of the two strings. For example, if the received encoded string is x=0110, and if the only possible encoded strings are c1=0100, c2=1101, which corresponding to wireless nodes 1 and 2 respectively, then the Hamming distance between x and c1 is 1, and that between x and c2 is 3. Since 1 is less than 3, the receiver decodes the received string into 0100, and maps it to node 1.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed:

1. An energy efficient wireless device having a sleep mode and a wake-up mode, the device comprising:
   a first receiver portion having an operational amplifier feeding a Direct Sequence Spread Spectrum decoder and an identity decoder, wherein the first receiver portion is a one-bit modem;
   a second receiver portion having an analog to digital converter feeding a signal processor, wherein the second receiver portion consumes more power than the first receiver portion;
   a first clock for providing timing to the first receiver portion; and
   a second clock for providing timing to the second receiver portion, the second clock having a precision greater than the first clock;
   wherein the first receiver portion is configured to:
      receive an analog signal having a header and a payload;
      convert the header to a digital signal using the operational amplifier;
      decode the digital signal using the Direct Sequence Spread Spectrum decoder; and
      compare, using the identity decoder, an encoded string in the header with a set of known digital strings associated with available receivers to determine if the device is the intended receiver by:
         determining a Hamming distance defined between the encoded string and each of the plurality of known digital strings;
         selecting the known digital string having the shortest Hamming distance to the encoded string;
         identifying the receiver associated with the selected digital string as the intended receiver; and
         determining, using the first receiver portion, whether the device is the intended receiver;
   wherein the device is configured to be placed in a sleep mode if the device is not the intended receiver; and
   wherein the second receiver portion is configured to wake up and decode the payload if the device is the intended receiver.

2. The device of claim 1 wherein the first receiver portion includes a computer readable medium storing a software program which when executed controls the application of power to be applied to the second receiver portion.

3. A method of reducing the power consumption of a wireless communications device, the device having a sleep mode and a wake-up mode, comprising the steps of:
   receiving, at a first receiver portion of the device, an analog signal having a header and a payload, wherein the first receiver portion is a one-bit modem comprising an operational amplifier feeding a direct sequence spread spectrum decoder and an identity decoder;
   converting the header to a digital signal in the first receiver portion using the operational amplifier;
   decoding the digital signal using the direct sequence spread spectrum decoder;
   comparing an encoded string in the header with a set of known digital strings associated with available receivers to determine if the device is the intended receiver using the identity decoder by:
      determining a Hamming distance defined between the encoded string and each of the plurality of known digital strings;
      selecting the known digital string having the shortest Hamming distance to the encoded string;
      identifying the receiver associated with the selected digital string as the intended receiver; and
      determining, using the first receiver portion, whether the device is the intended receiver;
   placing the device in a sleep mode if the device is not the intended receiver; and
   waking up a second receiver portion of the device and decoding the payload in the second receiver portion if the device is the intended receiver, wherein the second receiver portion consumes more power than the first receiver portion.

4. The method of claim 3, wherein the received signal includes a gap inserted between the header and the payload, and wherein the method further comprises a step of extracting an identity from the header during a period of time during which the gap exists.

5. The method of claim 4 wherein a known character string is transmitted during the period of time in which the gap exists.

6. The method of claim 3 wherein the step of decoding the payload includes the steps of:
   placing the second receiver portion in a wake-up mode; and
   converting the payload to a digital signal in the second receiver portion using an analog to digital converter.

7. The method of claim 6 further including steps of:
   using a first clock to determine when to place the first receiver portion in a wake-up mode; and
   using a second clock, having a higher precision than the first clock, when the first or second receiver portion is in wake-up mode.

8. The method of claim 7 further comprising a step of turning off the second clock when the first and second receiver portions are in a sleep mode.

9. The method of claim 7 further comprising a step of turning off the first clock when the first and second receiver portions are in wake-up mode.

10. The method of claim 3, further comprising placing the first receiver portion in wake-up mode by:
    starting a clock;
    tuning the receiver; and
    listening for a preamble and header of a transmitted signal.

11. The method of claim 3, wherein placing the device in a sleep mode comprises placing the device in a sleep mode in which the device does not attempt to detect signals.

* * * * *